United States Patent Office 3,047,975
Patented Aug. 7, 1962

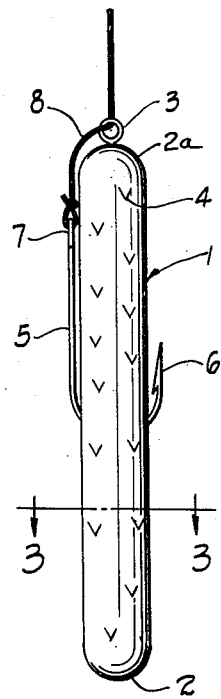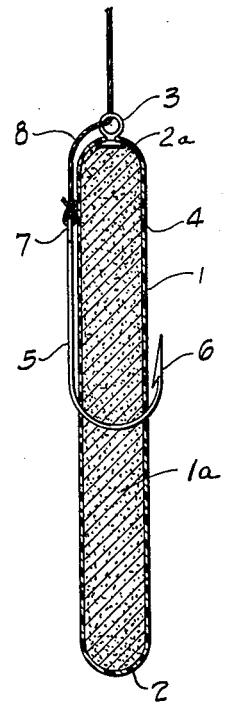

3,047,975
BAIT FOR FISHING
Yarl Pretorius, 4400 E. 175th St., Cleveland, Ohio
Filed May 20, 1960, Ser. No. 30,585
2 Claims. (Cl. 43—42.06)

This invention relates to fishing bait, and more particularly to a novel composition useful in conjunction with the same as well as the means for availing of such composition in use.

While many artificial baits have been contemplated, and in more recent times certain plastic compounds have been found useful in simulating bait such as worms or the like, up to the present time no similar bait and bait composition has been used as it conceived to be an advance and set forth herein, residing in the use of dried blood in some form or other, either by itself or mixed in with a material to act as a filler and thus reduce the quantity of blood required, or alternatively a food product mixed with the blood and itself useful in attracting fish thereto.

It has been found as a result of considerable experimentation, that the use of dried blood in combination with either dried, finely divided or ground meat or the like, when distributed in water, will attract fish and of course the blood is readily soluble in the water and thus provides attention getting material which itself increases the attraction for fish.

The various objects and advantages of this invention will be generally understood as comprising a novel bait composition, which when used for fishing purposes, will attract large numbers of fish, and by provision of suitable containers therefor in which hooks are provided, the fish may be caught and the effort required to do so reduced in many aspects.

Since the primary problem in regard to natural baits of various kinds is one of storage, it is pointed out that the composition contemplated by this invention, is one which will keep under all conditions whether or not refrigerated, and which is susceptible of being packaged in many different types of packages without spoiling and yet be readily and easily usable when so desired.

Other specific advantages of the invention may be said to reside in the fact that the products from which the bait composition is comprised are readily available, and in most cases waste products, not otherwise usable under ordinary conditions, or in any event sufficiently inexpensive to warrant packaging and sale of the same involving the other expenses entailed in conjunction therewith for distribution.

One specific advantage which is desirable to call to the attention at this point, is that the composition hereof may be packaged in a bait simulating a worm and when in use, provide for dissolving of the blood in such a manner as to attract the fish, with fish hooks used in conjunction with the bait whereby the fish may be caught.

Additional objects and further advantages of this invention will be understood from a consideration of the specification appended hereto and shown in the drawing wherein:

FIGURE 1 is a plan view of a bait formed in accordance with this invention, showing a fish hook positioned with regard thereto and connected to a line.

FIGURE 2 is a longitudinal sectional view of the bait shown in FIGURE 1.

FIGURE 3 is a sectional view taken about on the line 3—3 of FIGURE 1 looking in the direction of the arrows.

Referring to the drawing therefor initially, it will be seen that in FIGURE 1 a tubular or cylindrical casing is provided, denoted 1 generally, the end 2 sealed and rounded, the casing as a whole simulating a worm or similar bait member.

The other end 2a of the casing is similarly closed and has incorporated therein the eyelet denoted 3, for purposes which will be explained subsequently. This eyelet 3, may be formed of the casing material or be a separate part as shown.

The casing 1 is filled with a bait substance 1a and is provided with a series of V-shaped slits 4 which in use will provide for the entrance of water thereinto and the gradual seeping of water therefrom in a manner subsequently to be explained.

The casing 1 is formed as shown, and of a nature similar to a worm or like bait, and under some conditions may desirably be colored various colors which in and of itself would attract fish thereto, the casing preferably being of a plastic film-like material which would preserve or maintain in a state of preservation, a food product therewithin which would not spoil.

Under some conditions the casing could be supplied in vari-colored form, without the V-shaped slits 4 therein, and a small tool provided which could be used to form the slits as shown, these slits acting as sort of flap members for the purposes previously suggested.

A a matter of production economy, this sort of bait-like member could be supplied in packages of various types, or on cards or the like and the casing forming the covering could be shaped, or otherwise decorated for bait purposes.

It will also be apparent that the casing 1 could be of any preferred length, diameter or shape, even simulating small animals such as frogs or other food attractive to fish.

Since it is desirable to provide for the attraction of fish in even improved manner, the bait in this instance is filled with blood or some composition of material in which blood is a substantial component, the blood being preferably in dried and under some circumstances powdered or granule form. Blood is an excess, or surplus product in slaughterhouses and as such when dried and otherwise handled so as to be used in either a finely divided form or mixed or otherwise placed in the casing 1, it will keep for an indefinite period when furnished in a container or otherwise sealed with regard thereto. Even without such sealing and without any refrigeration, it will keep virtually indefinitely.

This particular bait is intended likewise under some circumstances to be filled with meat, in finely divided or ground or other form, mixed with the dried blood, and sealed in the casing 1 in the manner previously stated.

When such a composition is provided, it may be desirable to furnish a small instrument to perforate the casing to provide the V-shaped slits 4 therein but under other circumstances these bait members could be furnished in sealed containers as the composition may require for such a packaging arrangement.

In order to provide an economical bait form, it may be desirable under some circumstances to mix the dried blood with a cereal or other filler material so as to reduce the cost or processing thereof or to use a material which is cheaper and yet provide the necessary bulk and appearance for bait purposes.

In order to use the bait after the same has been provided as set forth, a fish hook such as 5 provided with the usual barbed end 6 and an eye at the opposite end 7, may be fastened to a line such as 8, and the hook thereafter impaled in the body of the bait member so as to assume about the position shown in FIGURE 1.

The line 8 is thereafter threaded through the eyelet 3 and may be equipped with weights or other additional similar bait members as the particular circumstances demand.

The bait is thereupon used as illustrated in FIGURE 1, and when it is in the water, the material including the dried blood therein, gradually dissolves and will find its way out of the various V-shaped slits 4, since the water will enter the same and be permitted to likewise seep therefrom.

I claim:

1. A bait for fishing comprising a flexible generally cylindrical casing, a series of openings therethrough, a fish hook impaled in said casing, an eye at one end of said casing, a fish line extending from the fish hook through the eye, and a bait composition filling said casing.

2. A bait for fishing comprising a tubular casing, a soluble composition therein, and a series of openings in said casing facilitating the entrance of liquid therein to dissolve the composition aforesaid a fish hook impaled in said casing, an eye at one end of said casing, and a fish line extending from the fish hook through the eye.

References Cited in the file of this patent

UNITED STATES PATENTS

| | | |
|---|---|---|
| 871,935 | Henzel | Nov. 26, 1907 |
| 2,555,088 | Irwin | May 29, 1951 |
| 2,827,376 | Brener | Mar. 18, 1958 |
| 2,869,279 | Pretorius | Jan. 20, 1959 |